United States Patent [19]

Sundström

[11] 4,077,781
[45] Mar. 7, 1978

[54] METHOD AND APPARATUS FOR FILTERING AND CLEANING THE FILTER

[75] Inventor: Nils Göran Sundström, Alta, Sweden

[73] Assignee: Atlas Copco Aktiebolag, Nacka, Sweden

[21] Appl. No.: 628,230

[22] Filed: Nov. 3, 1975

[30] Foreign Application Priority Data

Nov. 8, 1974   Sweden ............................... 7414092

[51] Int. Cl.² ........................................... B01D 46/04
[52] U.S. Cl. ........................................ 55/96; 55/283; 55/302; 55/379; 137/224.5; 137/625.65
[58] Field of Search .................. 55/96, 302, 292, 283, 55/379; 137/625.65, 224.5; 210/333

[56] References Cited

U.S. PATENT DOCUMENTS

| 2,818,081 | 12/1957 | Eichenauer ................. 137/224.5 |
| 3,243,940 | 4/1966 | Larson ........................... 55/96 |
| 3,339,586 | 9/1967 | Tenkku et al. ............ 137/625.65 |
| 3,394,532 | 7/1968 | Oetiker ............................ 55/302 |
| 3,436,899 | 4/1969 | Pausch ............................ 55/302 |
| 3,521,430 | 7/1970 | Vanderlip et al. .............. 55/283 |
| 3,680,285 | 8/1972 | Wellan et al. ................... 55/302 |
| 3,932,152 | 1/1976 | Rotondi ........................... 55/302 |

FOREIGN PATENT DOCUMENTS

| 248,453 | 12/1963 | Australia ....................... 55/302 |
| 1,007,726 | 10/1965 | United Kingdom ........... 55/302 |
| 125,118 | 4/1960 | U.S.S.R. ....................... 55/283 |

*Primary Examiner*—Bernard Nozick
*Attorney, Agent, or Firm*—Flynn & Frishauf

[57] ABSTRACT

A dust filter having a plurality of flat filter bag cassettes is cleaned by the introduction of a pulsed high velocity jet into each filter bag when a filtering period is terminated. A cleaning period comprises normally 20-50 pulses. The jets eject from expansion nozzles at a supersonic velocity.

12 Claims, 6 Drawing Figures

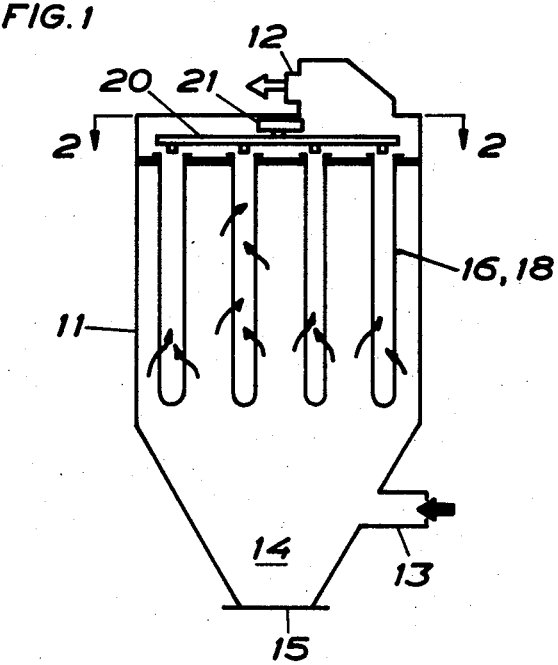
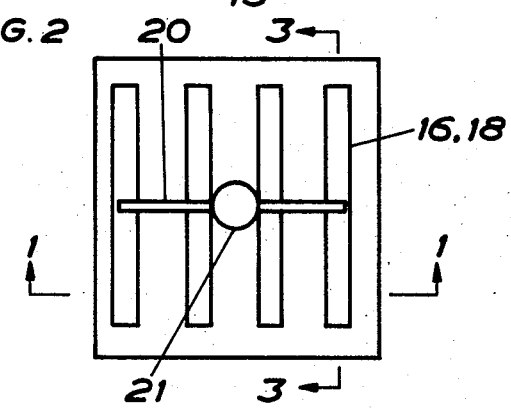
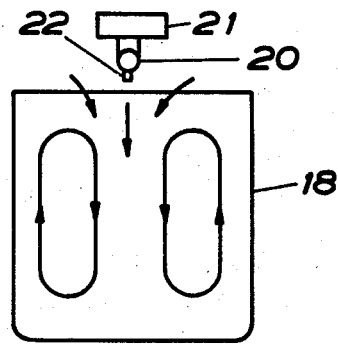
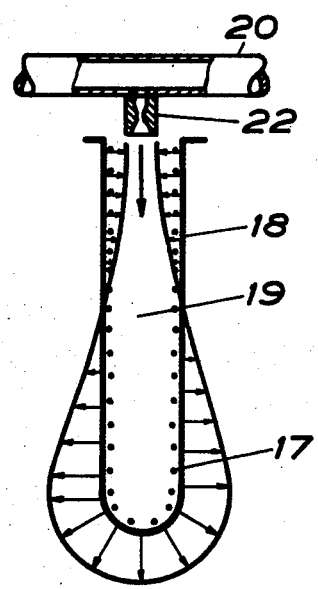

CONTROL UNIT

– 1 –

METHOD AND APPARATUS FOR FILTERING AND CLEANING THE FILTER

BACKGROUND OF THE INVENTION AND OBJECT OF THE INVENTION

This invention relates to a dust filter unit of the kind that comprises a plurality of flexible filter bags that are open to the clean air side and mounted on cages that prevent the bags from collapsing. The invention relates also to a method of cleaning such a filter unit.

It is common in the art to utilize a heavy reverse flow to clean the filters. The reverse flow carries dust with it out from the filter unit. Another method is to induce a propagation of a wave in the filter bags by means of low velocity air pulses that are introduced into hose filters through wide openings so that the air pulses will be as wide as the hoses. None of these methods are very efficient. Mechanical vibrators have also been used but they reduce the life of the filter bags substantially.

It is an object of the invention to provide for a fast and efficient cleaning of such filters with a minimum of wear and without introducing a heavy reverse flow.

BRIEF DESCRIPTION OF THE DRAWINGS

FIG. 1 is a section along line 1—1 in FIG. 2 of a dust filter unit according to the invention.

FIG. 2 is a section along line 2—2 in FIG. 1.

FIG. 3 is a section along line 3—3 in FIG. 2.

FIG. 6 is a section through any one of the filter bags shown in FIGS. 1–3 and it shows schematically the pressure differences in a filter bag that result from an air jet ejected from a nozzle.

DETAILED DESCRIPTION OF ILLUSTRATED EMBODIMENTS

Figure 4:
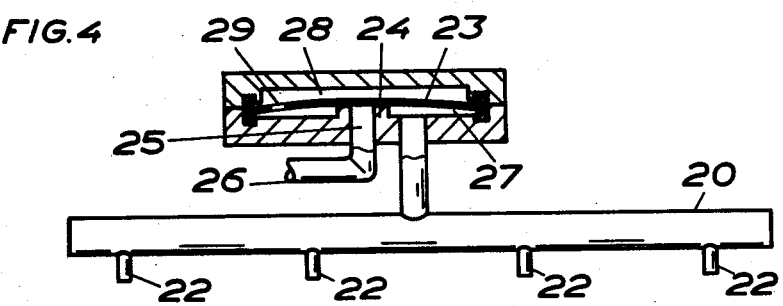
FIG. 4 shows at a larger scale and partly in section a dust cleaning device shown in FIGS. 1–3.

The dust filter unit shown in the figures has a closed housing 11 with an outlet 12 connectable to a hose from a vacuum source and an inlet 13 through which dust-laden air is sucked into a hopper 14 provided with a bottom shutter 15. The filter unit is a so called cassette filter with four filter cassettes or cages 16 having sides of wire net 17. Filter bags 18 of a textile e.g. a polyester-textile are mounted on the cages. The air that is sucked through the filter unit will have to pass through the filter textile from the outsides of the bags into their interior, and inside each filter bag is formed a flat, wide channel 19 that is open upwardly to the clean air side. Above the cassettes, there is a distribution pipe 20 that is connected to the outlet from a pulsator or self-oscillating pulse valve 21. This distribution pipe 20 extends transverse to the cassettes 16 above their center points and it has a nozzle over the center point of each cassette.

The pulse valve 21 is better shown in FIG. 4. It has a steel membrane 23 that is clamped to be biased against an annular seat 24, the interior of which forms an inlet chamber 25 for compressed air that is selectively supplied through a conduit 26. Around the seat 25, there is formed an annular outlet chamber 27 to which the air distribution pipe 20 is connected. On the other side of the membrane 23 there is formed a closed counter-pressure chamber 28 which is in a restricted communication with the outlet chamber 27 through a small pressure equalizing hole 29 in the membrane.

Advantageously, a control device (not illustrated) is arranged to start automatically the cleaning operation by pressurizing the inlet 26 of the pulse valve 21 each time the suction is shut off. When the inlet 26 of the pulse valve 21 is selectively pressurized, the membrane 23 moves off its seat 24 so that the outlet chamber and the distribution valve 20 are pressurized. Because of the pressure equalizing hole 29 in the membrane, the pressure in the counter pressure chamber 28 will then arise so that the membrane will again be forced against the seat 24 and interrupt the compressed air supply to the outlet chamber 27. The pressure in the outlet chamber 27 will then decrease as the air ejects out of the nozzles 22. Thereby, the pressure in the counter pressure chamber will also decrease so that the membrane 23 will again move off its seat. It is essential that the nozzles 22 have so small a total area that they form the dominating restriction in the system that is formed by the pulse valve 21, the distribution pipe 20 and the nozzles 22 that a full line pressure can build up in the distribution pipe 20 and high velocity jets will eject from the nozzles 22.

When a jet ejects from a nozzle 22 and into a filter bag 18, there will be a static sub-pressure in the upper part of the filter bag principally as can be seen from the pressure diagram in FIG. 6 where pressure is indicated with arrows directed outwardly and sub-pressure is indicated by arrows directed inwardly. This sub-pressure results from the very low static pressure in the jet. In the lower part of the filter bag where the velocity of the jet is lower, there will instead be an increased pressure and the flow in a filter bag seems to be as schematically shown in FIG. 3. The filter textile which is flexible or even somewhat elastic tends to move in the direction of the arrows in the pressure diagram.

When the jet is interrupted or when its velocity has decreased substantially, the pressure in the filter bag will be equalized and the textile moves back.

In order to get as high a velocity of the jet as possible and the low static pressure connected therewith, the nozzles 22 should be expansion nozzles e.g. Laval nozzles. If the pulse valve 21 is fed with air of ordinary line pressure e.g. 7 kp/cm$^2$, a jet can be ejected from an expansion orifice at a velocity of about 500 m/s while the velocity of the jet ejected from a cylindrical hole, i.e. from an orifice without internal expansion would be 250–300 m/s. The jet should be super-sonic at its entrance in the filter bag. The higher the speed of the jets the more effective the cleaning will be and the smaller the air consumption for the cleaning operation. Thirty pulses are for instance necessary for cleaning a filter. The repetition frequency for the pulses should be so low that a pressure equalization will substantially take place in the filter bags between the pulses and the movement of the filter bags will substantially terminate between the pulses. A pulse valve 21 of membrane type as shown in FIG. 4 can be tuned to operate sufficiently at such a low frequency as 1–3 Hz.

Although the filter bags have a length in their cross section that exceeds ten times their width, only one nozzle is necessary for each filter bag.

Figure 5:
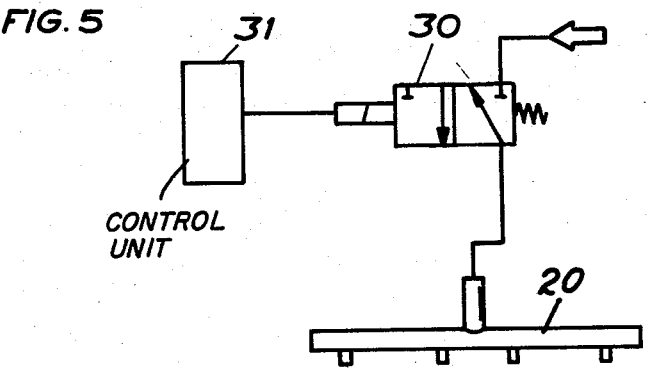
FIG. 5 shows schematically a device that can be used alternatively to the one shown in FIG. 4.

With a device according to FIG. 5 with a three-way solenoid valve 30, preferably a membrane valve, that is controlled electrically by a separate control unit 31, the distribution pipe 20 can periodically be pressurized and vented more distinctly than by a self-oscillating valve. As a result, the jets will terminate more abruptly when they still have their highest velocity. When a pulse valve according to FIG. 5 is used, the jets will slow down within a pulse rather than terminate abruptly. Another advantage of the device according to FIG. 5 is that the pulse length and the repetition frequency can be chosen independently of each other so that a short pulse length can be chosen despite of a low repetition frequency of for instance 1 Hz or less. Thereby, the air flow backwardly through the filter during a filter cleaning period will be still smaller. However, a small reverse flow through the filter is advantageous.

As an example of a filter unit according to the invention, a filter unit can be mentioned that is used for the dust-laden flush air that flows out of the bore hole during rock drilling. It contains eight flat filter cassettes that are about 1 meter long and has a cross section with a length of about 1 meter and a width of about 3 cm. The free space between the cassettes is also about 3 cm. The filter bag consists of a polyester-textile. This filter is cleaned by a cleaning system of the kind illustrated in FIG. 4 and a single nozzle is directed into each cassette as already described with a repetition frequency of about 2 Hz. Each cleaning period comprises 20-50 pulses. The diameter of the smallest portion of the nozzles is 1.7 mm and the diameter of the distribution pipe is 15 mm, i.e. the area of the distribution pipe is several times the total area of the nozzles.

What I claim is:

1. Method of cleaning a dust filter unit of the kind that comprises a plurality of flexible filter bags that are open to the clean air side and mounted on cages that prevent the filter bags from collapsing, the method comprising:
   terminating the flow of dust laden air into the filter prior to cleaning the filter,
   locating a distribution device having a plurality of nozzles so that the nozzles are in communication with the openings of all the filter bags, and
   cleaning all the filter bags simultaneously, while the flow of dust laden air is terminated, by injecting repetitively pulsed high velocity air jets from the nozzles into the filter bags, said high air velocity jets being formed by repetitive sudden pressurization and then venting of the distribution device having the plurality of nozzles, said high velocity air jets being injected substantially in parallel with the walls of the filter bags and being thin relative to the width of the filter bags so that a considerable part of the length of the jets do not touch the filter bags, the total area of said nozzles being so small that it is the dominating restriction in the system formed by the pulse valve arrangement and said air conveying means.

2. Method according to claim 1 wherein the time between the jet pulses is so long that there will be almost pressure equalization in the filter bags between the jet pulses.

3. Method according to claim 1 comprising repetitively pressurizing and venting the distribution device.

4. Method according to claim 1 wherein the filter bags have a length in their cross section which is larger than 10 times their width, comprising injecting only one pulsed jet into each filter bag.

5. Method according to claim 1 comprising ejecting the jets substantially perpendicularly to the openings of the filter bags.

6. Method according to claim 1 comprising injecting the jets into the filter bags such that they have super-sonic speed in the filter bags.

7. Method according to claim 1 comprising injecting the repetitively pulsed high velocity air jets from expansion nozzles into the filter bags.

8. A dust filter unit comprising:
   a housing,
   a plurality of substantially parallelly arranged filter bags in the housing and dividing the housing into a lower dusty air chamber and an upper clean air chamber, said filter bags being open to the clean air chamber,
   a plurality of cages in said housing on which respective filter bags are mounted to prevent them from collapsing,
   an inlet in the housing for admission of dusty air into said dusty air chamber of the housing,
   an outlet in said housing for exit of clean air from said clean air chamber of the housing,
   a selectively activatable automatic pulse valve arrangement connectable to a source of pressurized air,
   an air conveying means connected to said pulse valve arrangement and having a plurality of expansion nozzles directed to inject high velocity jets into the filter bags substantially in parallel with the filter bags, said jets being thin relative to the width of the filter bags, the total area of said nozzles being so small that it is the dominating restriction in the system formed by the pulse valve arrangement and said air conveying means,
   said pulse valve arrangement including means for repetitively and suddenly pressurizing and alternately venting said air conveying means when activated to produce repetitively pulsed high velocity air jets, and
   means for terminating the flow of dusty air into said dusty air chamber before the activation of said automatic pulse valve and before said repetitive pressurizing and venting of said air conveying means.

9. A dust filter unit according to claim 8 wherein the length of each filter bag in its cross-section is larger than 10 times its width, and comprising a single nozzle for each filter bag.

10. A dust filter unit according to claim 8 wherein said pulse valve arrangement injects said high velocity jets into the filter bags with a super-sonic speed in the filter bags.

11. A dust filter unit according to claim 8 wherein said pulse valve arrangement is arranged to provide jets having a time period between jets which is sufficiently long that there will be almost pressure equalization in the filter bags between the jet pulses.

12. A dust filter unit according to claim 8 wherein said expansion nozzles have a diameter of about 1.7 mm.

* * * * *

UNITED STATES PATENT AND TRADEMARK OFFICE
CERTIFICATE OF CORRECTION

PATENT NO. : 4,077,781
DATED : March 7, 1978
INVENTOR(S) : Nils Göran SUNDSTRÖM

It is certified that error appears in the above-identified patent and that said Letters Patent are hereby corrected as shown below:

Column 3 (claim 1), line 43, change "high air velocity" to --high velocity air--.

Signed and Sealed this

Fourth Day of July 1978

[SEAL]

Attest:

RUTH C. MASON
Attesting Officer

DONALD W. BANNER
Commissioner of Patents and Trademarks